(12) United States Patent
Herrera

(10) Patent No.: US 9,681,738 B1
(45) Date of Patent: Jun. 20, 2017

(54) FLEXIBLE CARRYING STRAP DEVICE

(71) Applicant: Yurien Herrera, Homestead, FL (US)

(72) Inventor: Yurien Herrera, Homestead, FL (US)

( * ) Notice: Subject to any disclaimer, the term of this patent is extended or adjusted under 35 U.S.C. 154(b) by 0 days.

(21) Appl. No.: 15/353,839

(22) Filed: Nov. 17, 2016

(51) Int. Cl.
*A45F 3/14* (2006.01)
*B65G 7/12* (2006.01)

(52) U.S. Cl.
CPC .................. *A45F 3/14* (2013.01); *B65G 7/12* (2013.01); *A45F 2003/142* (2013.01)

(58) Field of Classification Search
CPC .................................... A45F 3/14; B65G 7/12
USPC .... 294/148, 149, 150, 152, 157, 165, 119.2; 224/250; 220/592.2
See application file for complete search history.

(56) References Cited

U.S. PATENT DOCUMENTS

| | | | | |
|---|---|---|---|---|
| 618,333 | A * | 1/1899 | Colteryahn | A45F 5/10 294/157 |
| 925,986 | A * | 6/1909 | Blackburn | A45F 5/10 294/152 |
| 3,172,586 | A | 3/1965 | Lu | |
| 3,563,433 | A * | 2/1971 | Yoshiura | A45F 5/10 294/157 |
| 3,933,287 | A * | 1/1976 | Foley | B65D 63/18 294/149 |
| 4,127,223 | A | 11/1978 | Uchin | |
| 4,972,981 | A | 11/1990 | Gex | |
| 5,409,282 | A * | 4/1995 | Bale | A45C 3/00 294/146 |
| 5,954,254 | A | 9/1999 | Maeng | |
| 6,193,293 | B1 * | 2/2001 | Ybanez | B65G 7/12 294/152 |
| D460,620 | S * | 7/2002 | Smithey | D3/315 |
| 6,953,214 | B2 * | 10/2005 | Paz | A45F 3/14 294/152 |
| D564,761 | S | 3/2008 | McGlenn | |
| 8,047,554 | B2 | 11/2011 | Burns | |
| 9,220,330 | B2 * | 12/2015 | Kelson | A45C 13/38 |
| 2006/0055192 | A1 * | 3/2006 | Hirsch | A45F 3/14 294/157 |
| 2011/0057004 | A1 | 3/2011 | Anderson | |
| 2014/0091119 | A1 | 4/2014 | Racanati | |

FOREIGN PATENT DOCUMENTS

EP          2684582          8/2012

* cited by examiner

*Primary Examiner* — Paul T Chin

(57) ABSTRACT

A flexible carrying strap device for flexibly securing and carrying a flat, elongated object includes a pair of straps each forming a respective loop configured to extend around a flat, elongated object. The opposite ends of a front handle are coupled to the respective loops defining front junctions. The opposite ends of a back handle are coupled to the respective loops defining back junctions. The device also comprises a pair of bands each having opposing termini. The opposing termini of each the pair of bands are coupled to and extend between one of the front junctions and a respective one of the back junctions. One of each of a pair of connectors is coupled to a respective one of the pair of straps. Each of the pair of straps is couplable to a respective one of the connectors to form the respective loops.

8 Claims, 4 Drawing Sheets

FLEXIBLE CARRYING STRAP DEVICE

BACKGROUND OF THE DISCLOSURE

Field of the Disclosure

The disclosure relates to carrying strap devices and more particularly pertains to a new carrying strap device for flexibly securing and carrying a flat, elongated object.

SUMMARY OF THE DISCLOSURE

An embodiment of the disclosure meets the needs presented above by generally comprising a pair of straps each forming a respective loop configured to extend around a flat, elongated object. The opposite ends of a front handle are coupled to the respective loops defining front junctions. The opposite ends of a back handle are coupled to the respective loops defining back junctions. The device also comprises a pair of bands each having opposing termini. The opposing termini of each the pair of bands are coupled to and extend between one of the front junctions and a respective one of the back junctions. One of each of a pair of connectors is coupled to a respective one of the pair of straps. Each of the pair of straps is couplable to a respective one of the connectors to form the respective loops.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
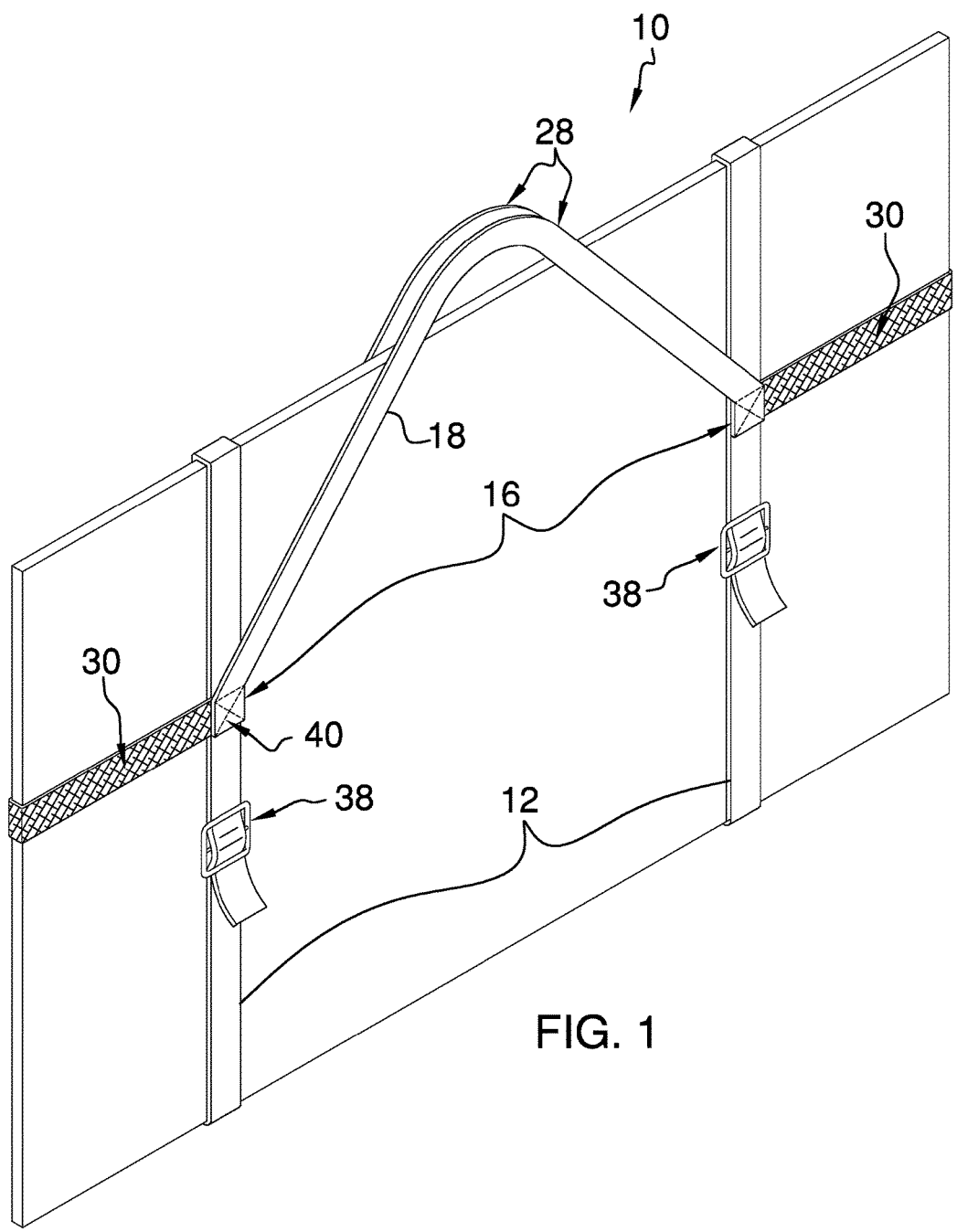
FIG. 1 is an isometric perspective in-use view of a flexible carrying strap device according to an embodiment of the disclosure.
Figure 2:
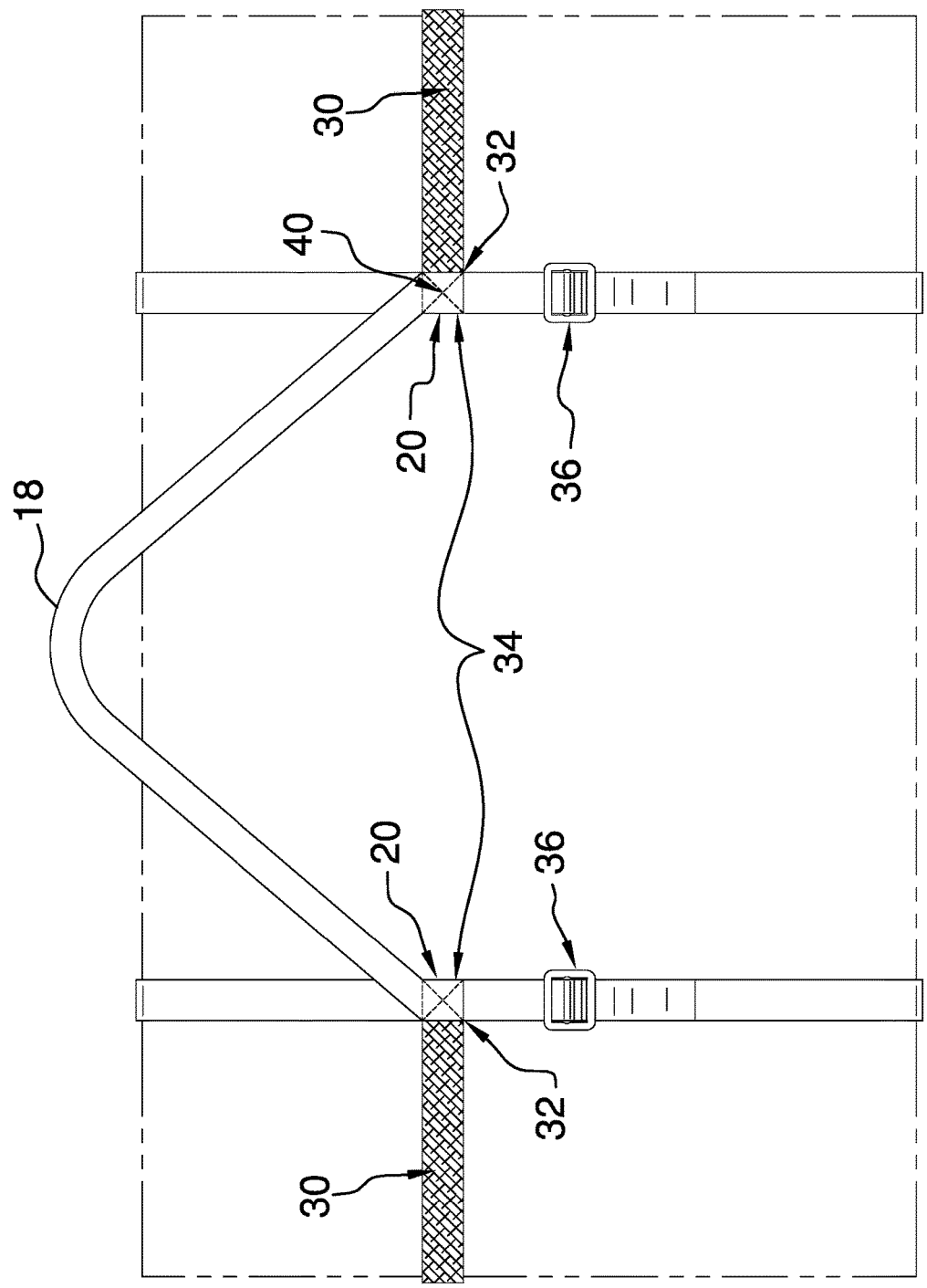
FIG. 2 is a front in-use view of an embodiment of the disclosure.
Figure 3:
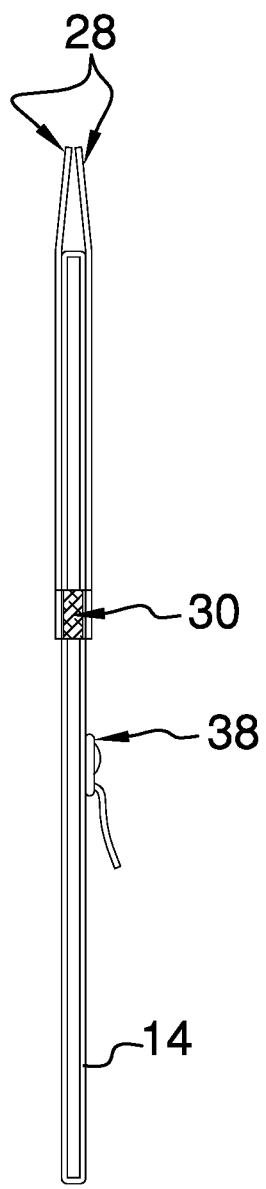
FIG. 3 is a side in-use view of an embodiment of the disclosure.
Figure 4:
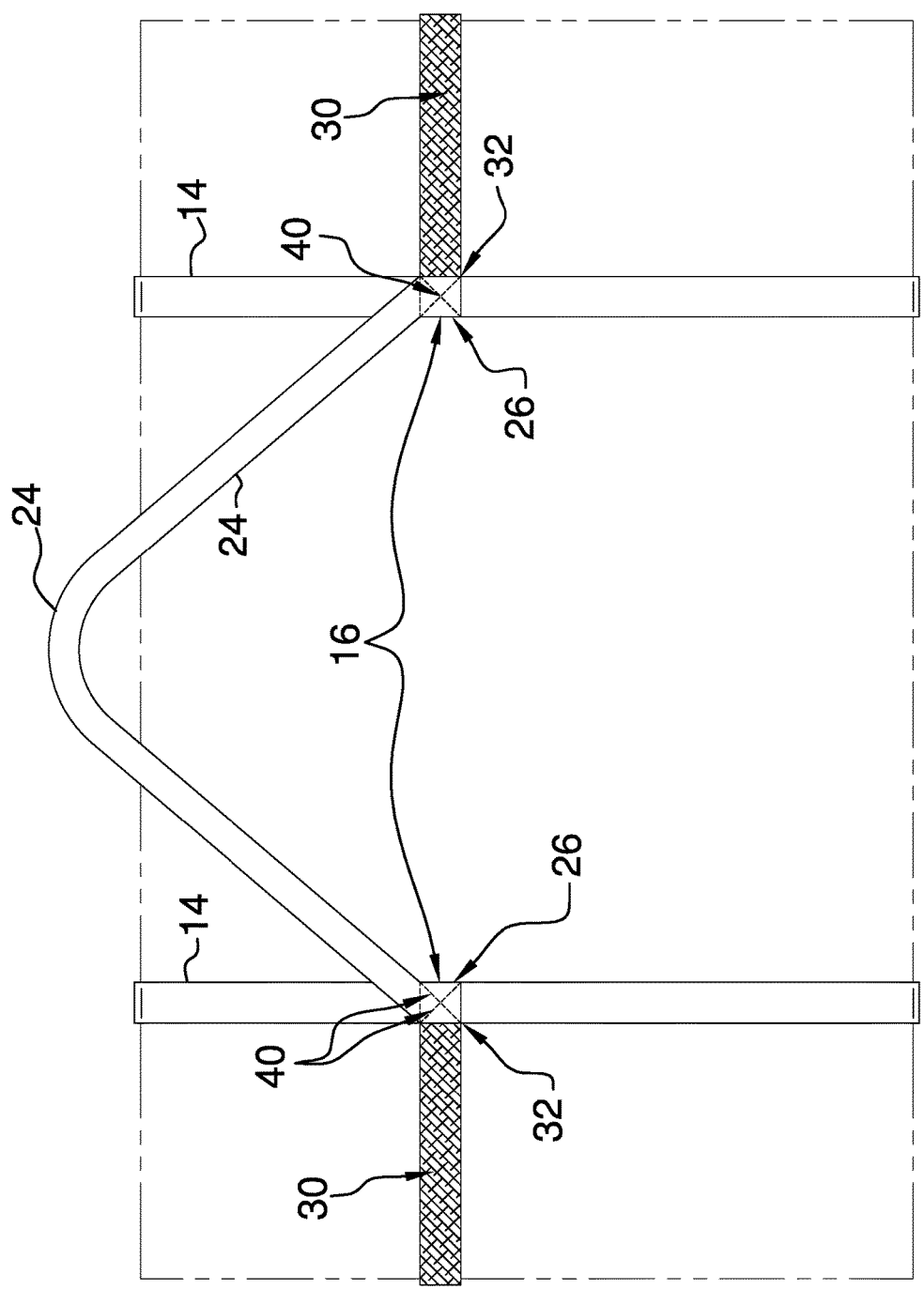
FIG. 4 is a back in-use view of an embodiment of the disclosure.

With reference now to the drawings, and in particular to FIGS. 1 through 4 thereof, a new carrying strap device embodying the principles and concepts of an embodiment of the disclosure and generally designated by the reference numeral 10 will be described.

As best illustrated in FIGS. 1 through 4, the flexible carrying strap device 10 generally comprises a pair of straps 12 each forming a respective loop 14 configured to extend around a flat, elongated object. The opposite ends 16 of a front handle 18 are coupled to the respective loops 14 defining front junctions 20. The opposite ends 16 of a back handle 24 are coupled to the respective loops 14 defining back junctions 26, such that the handles 28 extend between the respective loops 14, and such that the device 10 is configured to lift the flat, elongated object. Preferably, the pair of straps 12 and the handles 28 are comprised of nylon.

The device 10 also comprises a pair of bands 30 each having opposing termini 32. The opposing termini 32 of each the pair of bands 30 are coupled to and extend between one of the front junctions 20 and a respective one of the back junctions 26. Each of the bands 30 extends transversely from the junctions 34 relative to the handles 28. The pair of bands 30 is flexible, preferably elastic.

One of each of a pair of connectors 36 is coupled to a respective one of the pair of straps 12. Each of the pair of straps 12 is couplable to a respective one of the connectors 36 to form the respective loops 14. Preferably, the pair of connectors 36 comprises buckles 38.

Each of the junctions 34 comprises a plurality of stitches 40. Each of the pluralities of stitches 40 extends through and binds together a respective opposite end 16 of the handle 28, a respective one of the pair of straps 12, and a respective one of the opposing termini 32 of the band 30.

In use, the respective loops 14 are configured to extend around a flat, elongated object such as a painting or poster board and the pair of bands 30 are configured to retain the object in the respective loops 14 for carrying by the handles 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flexible carrying strap device comprising:
    a pair of straps, each of said straps forming a respective loop configured for extending around a flat, elongated object;
    a front handle and a back handle, each of said handles having opposite ends, said opposite ends of said front handle being coupled to said respective loops defining front junctions, said opposite ends of said back handle being coupled to said respective loops defining back junctions;
    a pair of bands; each of said pair of bands having opposing termini, said opposing termini of each said pair of bands being coupled to and extending between one of said front junctions and a respective one of said back junctions; and a pair of connectors, one of each said pair of connectors being coupled to a respective one of said pair of straps, each of said pair of straps being couplable to a respective one of said connectors to form said respective loops.

2. The device of claim 1, further including said pair of connectors being buckles.

3. The device of claim 1, further including each said band extending transversely from said junctions relative to said handles.

4. The device of claim 1, further including said pair of bands being flexible.

5. The device of claim 1, further including said pair of bands being elastic.

6. The device of claim 1, further including said pair of straps, said front handle, and said back handle being comprised of nylon.

7. The device of claim 1, further including each of said junctions comprising a plurality of stitches, each of said pluralities of stitches extending through and binding together a respective opposite end of said handle, a respective one of said pair of straps, and a respective one of said opposing termini of said band.

8. A flexible carrying strap device comprising:

a pair of straps, each of said straps forming a respective loop configured for extending around a flat, elongated object;

a front handle and a back handle, each of said handles having opposite ends, said opposite ends of said front handle being coupled to said respective loops defining front junctions, said opposite ends of said back handle being coupled to said respective loops defining back junctions, such that each said handle extends between said respective loops wherein said handles are configured for lifting the flat, elongated object;

a pair of bands; each of said pair of bands having opposing termini, said opposing termini of each said pair of bands being coupled to and extending between one of said front junctions and a respective one of said back junctions, each said band extending transversely from said junctions relative to said handles, said pair of bands being flexible, said pair of bands being elastic;

a pair of connectors, one of each said pair of connectors being coupled to a respective one of said pair of straps, each of said pair of straps being couplable to a respective one of said connectors to form said respective loops, said pair of connectors being buckles;

said pair of straps, said front handle, and said back handle being comprised of nylon;

each of said junctions comprising a plurality of stitches, each of said pluralities of stitches extending through and binding together a respective opposite end of said handle, a respective one of said pair of straps, and a respective one of said opposing termini of said band; and wherein said respective loops are configured for extending around a flat, elongated object such as a painting or poster board and said pair of bands are configured to retain the object in said respective loops for carrying by said handles.

* * * * *